(12) United States Patent
Niedermeier (10) Patent No.: US 7,982,799 B2
(45) Date of Patent: Jul. 19, 2011

(54) METHOD AND DEVICE FOR INTERPOLATION OF AN IMAGE INFORMATION VALUE FOR PIXEL OF AN INTERLINE

(75) Inventor: Ulrich Niedermeier, Munich (DE)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 1233 days.

(21) Appl. No.: 11/618,337

(22) Filed: Dec. 29, 2006

(65) Prior Publication Data

US 2007/0153124 A1    Jul. 5, 2007

(30) Foreign Application Priority Data

Dec. 30, 2005  (DE) .................. 10 2005 063 072

(51) Int. Cl.
*H04N 11/20* (2006.01)
(52) U.S. Cl. ........................ 348/448; 348/452
(58) Field of Classification Search .............. 348/448, 348/458, 452, 581, 441, 701; 382/298–300; 345/606, 609, 610
See application file for complete search history.

(56) References Cited

U.S. PATENT DOCUMENTS

| | | | | |
|---|---|---|---|---|
| 5,093,721 A * | 3/1992 | Rabii | ............................. | 348/448 |
| 5,625,421 A | 4/1997 | Faroudja et al. | ............... | 348/607 |
| 6,133,957 A | 10/2000 | Campbell | ..................... | 348/458 |
| 6,181,382 B1 * | 1/2001 | Kieu et al. | ..................... | 348/459 |
| 6,731,342 B2 * | 5/2004 | Shin et al. | ..................... | 348/452 |
| 6,965,705 B1 | 11/2005 | Ma et al. | ........................ | 382/300 |
| 7,015,971 B2 * | 3/2006 | Sirtori et al. | .................. | 348/448 |
| 7,023,487 B1 * | 4/2006 | Adams | .......................... | 348/448 |
| 7,057,664 B2 * | 6/2006 | Law et al. | ..................... | 348/448 |
| 7,092,032 B1 * | 8/2006 | Matsunaga et al. | ........... | 348/452 |
| 7,259,794 B2 * | 8/2007 | Chang et al. | .................. | 348/452 |
| 7,315,331 B2 * | 1/2008 | Franzen | ....................... | 348/452 |
| 7,362,378 B2 * | 4/2008 | Orlick | ........................... | 348/452 |

(Continued)

FOREIGN PATENT DOCUMENTS

EP          0550231          3/1997 ........................... 7/1

OTHER PUBLICATIONS

De Haan et al., "De-Interlacing of Video Data Using Motion Vectors and Edge Information", Digest of the ICCE '02, Jun. 2002.
T. Doyle, "Interlaced to Sequential Conversion for EDTV Applications," Proc. of $2^{nd}$ Int. Workshop on Signal Processing of HDTV, L'Aquila, Italy, 1988, pp. 421-430.

(Continued)

*Primary Examiner* — Victor Kostak
(74) *Attorney, Agent, or Firm* — O'Shea Getz P.C.

(57) ABSTRACT

The invention relates to interpolation of an image information value for a pixel of an interline. The method comprises selecting, from a number of image directions, to each of which a direction quality value is assigned, a direction of interpolation by comparing these direction quality values. The image information value being interpolated is determined in dependence on image information values assigned to pixels lying adjacent to the pixel being interpolated in the direction of interpolation. To ascertain a direction quality value for an image direction a pixel group having at least two pixels is selected; a single direction quality value for each pixel of the pixel group is determined, the single direction quality value being dependent on image information values assigned to image regions lying adjacent to the particular pixel of the group in the image direction; and a direction quality value is created as a function of the single direction quality values of the pixel group.

24 Claims, 8 Drawing Sheets

U.S. PATENT DOCUMENTS

| | | | |
|---|---|---|---|
| 7,423,691 B2 * | 9/2008 | Orlick et al. | 348/448 |
| 7,474,789 B2 * | 1/2009 | Wang et al. | 382/199 |
| 7,515,205 B1 * | 4/2009 | Wang et al. | 348/452 |
| 7,538,824 B1 * | 5/2009 | Pillay et al. | 348/701 |
| 7,567,294 B2 * | 7/2009 | Lu et al. | 348/452 |
| 7,667,773 B2 * | 2/2010 | Han | 348/452 |
| 7,796,191 B1 * | 9/2010 | Vojkovich | 348/448 |
| 7,808,553 B2 * | 10/2010 | Kim et al. | 348/452 |
| 2005/0134602 A1 | 6/2005 | Winger et al. | 345/606 |
| 2005/0157951 A1 | 7/2005 | Xavier | 382/300 |
| 2005/0225564 A1 | 10/2005 | Shan | |
| 2006/0268168 A1 * | 11/2006 | Au et al. | 348/448 |
| 2007/0070244 A1 * | 3/2007 | Wyman et al. | 348/448 |

OTHER PUBLICATIONS

Doyle et al., "Progressive Scan Conversion Using Edge Information," Proc. of $3^{rd}$ Int. Workshop on HDTV, Torino, Italy, 1988 pp. 711-721.

Lee et al., "A New Algorithm for Interlaced to Progressive Scan Conversion Based on Directional Correlations and Its IC Design," IEEE Transactions on Consumer Electronics, vol. 40, No. 2, May 1994, pp. 119-129.

Fan et al., "Intelligent Intra-Field Interpolation for Motion Compensated Deinterlacing," $3^{rd}$ International Conference on Information Technology ITRE 2005, Jun. 2005, pp. 200-203.

* cited by examiner

|  | x-3 | x-2 | x-1 | x | x+1 | x+2 | x+3 |
|---|---|---|---|---|---|---|---|
| y+2 | x—22 |  |  | x—25 |  |  | x—28 |
| y | x—12 |  |  | x—15 |  |  | x—18 |
| y-2 | x—32 |  |  | x—35 |  |  | x—38 | dx=-7 ... -4
dx=4 ... 7

FIG 5B

|  | x-3 | x-2 | x-1 | x | x+1 | x+2 | x+3 |
|---|---|---|---|---|---|---|---|
| y+2 |  | x—23 | x |  |  | x—27 |  |
| y |  | x—13 | x |  |  | x—17 |  |
| y-2 |  | x—33 | x |  |  | x—37 |  | dx=-3, -2
dx=2, 3

FIG 5C

|  | x-3 | x-2 | x-1 | x | x+1 | x+2 | x+3 |
|---|---|---|---|---|---|---|---|
| y+2 |  | 24—x | x | x—26 |  |  |  |
| y |  | 14—x | x | x—16 |  |  |  |
| y-2 |  | 34—x | x | x—36 |  |  |  | dx=-1, 0, 1

Class 0 | -7 | -6 | -5 | -4 |

Class 1 | -3 | -2 |

Class 2 | -1 |

Class 3 | 0 |

Class 4 | 1 |

Class 5 | 2 | 3 |

Class 6 | 4 | 5 | 6 | 7 |

METHOD AND DEVICE FOR INTERPOLATION OF AN IMAGE INFORMATION VALUE FOR PIXEL OF AN INTERLINE

PRIORITY INFORMATION

This patent application claims priority from German patent application 10 2005 063 072.3 filed Dec. 30, 2005, which is hereby incorporated by reference.

BACKGROUND INFORMATION

The invention relates to the field of video signal processing, and in particular to interpolation of an image information value for a pixel of an interline situated between two original image lines in an image.

For the transmission of video images or television images, it is known how to transmit interlaced fields instead of frames in which an image information value is present for each pixel of the image. Each of these frames transmitted contains a number of scanning lines, each of which contain a number of pixels. Image information values, i.e., luminance values or chrominance values, are only present for the pixels of every other line, and frames are transmitted alternatingly in which image information values are present for pixels of even numbered lines and for pixels of odd numbered lines.

In order to turn such a transmitted field into a frame for representation on a display device, such as a monitor screen, it is necessary to interpolate image information values for the interlines. In so-called intra-field algorithms, the interpolation of an image information value for a pixel of an interline of a field only uses image information values of pixels from the same field.

In the most elementary case, the available image lines of a field are doubled to produce a frame. The image information values of the pixels of an interline interpolated in this way then correspond to the image information values of the image lines lying above or below the interline. Edges running in the diagonal direction through an image being depicted will, however, appear as "steps" in the frame with this kind of interpolation. One method for avoiding such steplike artifacts in a frame generated from a field is described, for example, in U.S. Pat. No. 5,625,421.

In the Edge Based Line Average (ELA) algorithm, for each pixel to be interpolated one determines the direction of a possible edge containing this pixel. The algorithm is described, for example, in T. Doyle, "*Interlaced to Sequential Conversion for EDTV Applications*" Proc. of 2nd Int. Workshop on Signal Processing of HDTV, L'Aquila, Italy, 1988, or in T. Doyle, and M Looymans, "*Progressive Scan Conversion Using Edge Information*" Proc. of 3rd Int. Workshop on HDTV, Torino, Italy, 1989, or in Lee et al.: "*A New Algorithm for Interlaced to Progressive Scan Conversion Based on Directional Correlations and its IC design*," IEEE Transactions on Consumer Electronics, Volume 40, Number 2, May 1994, page 119.

In the ELA algorithm, one determines the difference, for various image directions, between the image information values of two pixels lying adjacent to the pixel being interpolated in the particular direction. The direction for which the magnitude of this difference is a minimum is used as the direction of the edge contour. The image information value of the pixel being interpolated is then interpolated by making use of pixels situated adjacent in this direction to the pixel being interpolated. Ambiguities can present a problem in this method, as will be explained hereinbelow with reference to FIGS. 1 and 2.

Figure 1:
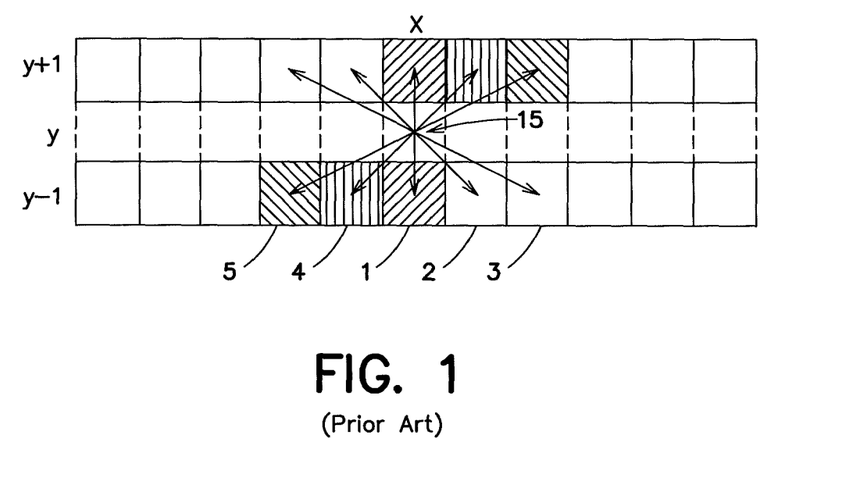
FIG. 1 illustrates the problems of ambiguities in determining the direction of an edge contour in an image for a prior art method.

FIG. 1 shows a segment with two original image lines y−1, y+1 of a matrix-type field. Each of these lines has a number of pixels to which image information values, such as luminance values, are assigned. In FIG. 1, y denotes an interline being interpolated. Let us now consider a pixel 15 being interpolated at an image position (x,y). The arrows denoted 1 to 5 illustrate various image directions in FIG. 1 for which a possible edge contour is being investigated. The presence of an edge in a direction is assumed if pixels lying adjacent to the pixel 15 being interpolated in the particular direction have the same or approximately the same luminance values. As can be seen from FIG. 1, which represents the different luminance values of the individual pixels by different shading patterns, various directions for which this criterion is fulfilled may exist. In FIG. 1, the aforementioned "edge criterion" is fulfilled for all five directions shown, whereas in fact the edge runs in the direction illustrated by arrow 4.

Figure 2:
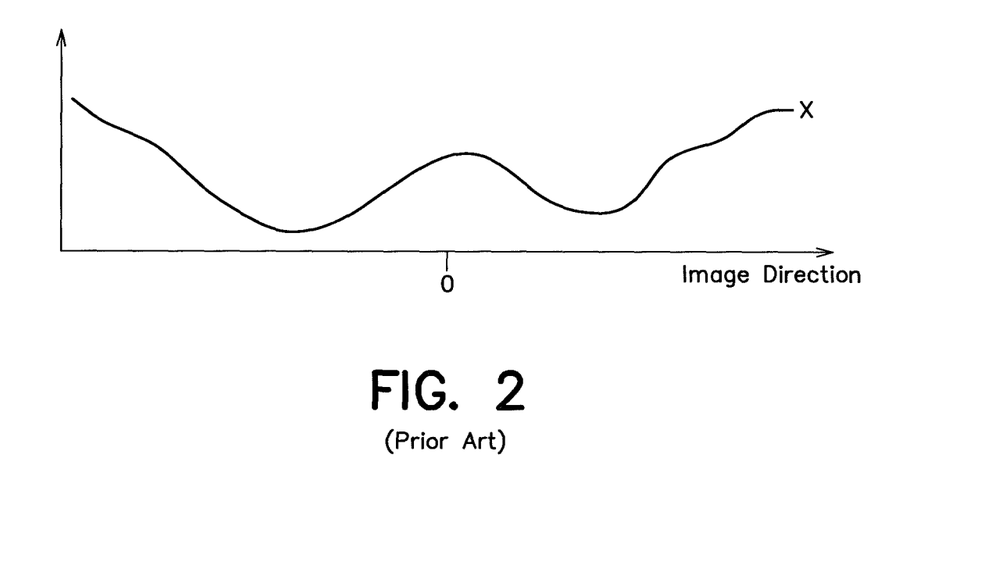
FIG. 2 illustrates the problem of ambiguities in the determination of the direction of an edge contour in an image; the FIG. shows, for a pixel being interpolated, the plot of direction values, each representing a measure of the probability of an edge contour in a particular direction.

In FIG. 2, direction values for different image directions are plotted generally for a pixel being interpolated. The individual direction values correspond here to the magnitude of the difference of the image information values of those original pixels lying adjacent to the pixel being interpolated in the respective direction dx. The presence of an edge in an image direction is all the more probable as the corresponding direction value is smaller. As already explained with reference to FIG. 1, the trend of the direction values $q(x,y)$ can still have ambiguities in the sense that the direction values for two or more image directions $dx1$, $dx2$ form local minima of the curve, so that two or more image directions $dx1$, $dx2$ can be considered as possible directions for edge contours and, thus, possible directions of interpolation.

Other methods of interpolation of an image information value are described in U.S. Pat. No. 6,965,705, EP 0 550 231, published U.S. Patent Applications 2005/0157951 and US 2005/0134602, PCT application WO 99/19834, or in FAN, YU-CHENG; et al.: "*Intelligent Intra-Field Interpolation for Motion Compensated Deinterlacing*", 3rd International Conference on Information Technology ITRE 2005. 27-30 Jun. 2005, pp. 200-203.

There is a need for an interline interpolation that ensures an improved interpolation technique of edges running through the image.

SUMMARY OF THE INVENTION

Interpolation of an image information value for a pixel of an interline calls for selecting, from a number of image directions, to each of which a direction quality value is assigned, a direction of interpolation by selecting these direction quality values, and interpolating the image information value being interpolated in dependence on image information values assigned to pixels lying adjacent to the pixel being interpolated in the direction of interpolation. The following steps of the method are specified for determining a direction quality value for an image direction:

determine a single direction quality value for each pixel of a pixel group with at least two pixels, the single direction quality value being dependent on image information values assigned to image regions lying adjacent to the particular pixel in the image direction, create the direction quality value as a function of the single direction quality values (q) of the pixel group.

The direction quality value may correspond to the mean of the single quality values.

A single direction quality value assigned to an image direction represents a measure of the probability that an edge travels in the particular image direction in the image. Now, in order to determine, for a pixel being interpolated, the probability of the presence of an edge contour in a given image direction, several such single direction quality values, representing a probability of the presence of an edge contour, are added up and the thus obtained (composite) direction quality values are used to select an image direction as the direction of interpolation. Investigations have shown that such an addition of the single direction values of several adjacent pixels can prevent or at least reduce ambiguities in the determination of an optimal image direction.

These and other objects, features and advantages of the present invention will become more apparent in light of the following detailed description of preferred embodiments thereof, as illustrated in the accompanying drawings.

DETAILED DESCRIPTION OF THE INVENTION

Figure 3:
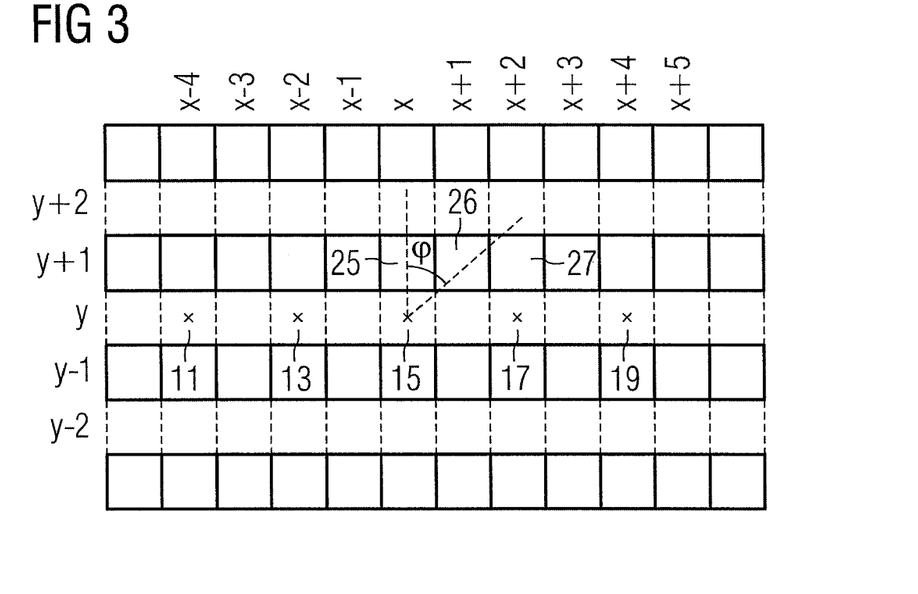
FIG. 3 shows a segment of a matrix type field with a number of original image lines and a number of interlines to be interpolated between the original image lines.

Interpolation of an image information value of a pixel of an interline of a field shall now be explained. FIG. 3 shows schematically a segment of such a field, having original image lines y−3, y−1, y+1, y+3, each of them subdivided into a number of pixels. To increase the image resolution or improve the picture, it is desirable to interpolate, between every two of these original image lines, an additional image line y−2, y, y+2, hereinafter denoted as an interline, each of them containing a number of pixels. The pixels of the original image lines are represented in FIG. 3 as squares with solid lines, while the pixels of the interlines are represented as squares with partially broken lines.

The original image lines y−3, y−1, y+1, y+3 with the original pixels and the interlines y−2, y, y+2 being interpolated, with the pixels being interpolated, are part of an image in which the original pixels and the pixels being interpolated are arranged in a matrix. A first direction of this pixel matrix, in which the pixels of a line are arranged adjacent to each other, is termed hereinafter the horizontal image direction or x direction, while a second direction in which the individual lines are arranged adjacent to each other is termed hereinafter the vertical direction or y direction.

The original pixels (i.e., the pixels of the original image lines) are each assigned image information values, while the pixels being interpolated (i.e., the pixels of the interlines) are to be assigned such image information values by interpolation of the image information values of original pixels. These image information values may be luminance values or chrominance values.

Image directions can be defined in the image depicted partially in FIG. 3, which contains pixels arranged in a matrix. For the following discussion, these image directions will be defined using an angle φ. The angle φ is the angle by which the particular image direction deviates from the vertical. For the tangent of this angle we have:

$$\tan = (\varphi)\frac{dx}{dy} \quad (1)$$

where dx denotes the horizontal distance between two pixels arranged adjacent to each other in the particular image direction (i.e., they lie on a straight line running in the image direction); dy denotes the vertical distance between two pixels lying on this straight line running in the image direction. An image direction in the following discussion for dy=1 is defined by using the horizontal distance dx of two pixels lying on the straight line running in the image direction. In this case we have:

$$dx = \arctan(\varphi) \quad (2)$$

where dx thus corresponds to the horizontal distance of two pixels lying in image lines arranged directly next to each other in the vertical direction, and lying on the straight line establishing the image direction. The vertical is defined as dx=0. Referring to FIG. 3, for example, pixel 15 being interpolated and the pixel 25 of the original image line y−1, lying at the same horizontal position x as the pixel 15 being interpolated, are adjacent to each other in this vertical direction. The direction angle φ in this case is 0°, since arctan(0)=0°. denotes an image direction deviating by the direction angle φ=45° from the vertical denoted by dx=1. In this direction, for example the pixel 15 being interpolated and the pixel 26, lying in the original image line y−1 and whose horizontal position is displaced by dx=1 relative to the horizontal position of pixel 15, are adjacent to each other.

The definition of an image direction using the horizontal distance dx is, of course, not limited to integer values of dx. Thus, dx=0.5 denotes, for example, an image direction defined by two pixels whose horizontal distance is dx=1 and whose vertical is dy=2.

For interpolation of an image information value S(x,y) for the pixel 15 being interpolated, having coordinates (x,y), one will select a group of pixels, which may include the pixel being interpolated. Referring to FIG. 3, this group of pixels being interpolated contains, for example, the pixels 11, 13, 17, and 19 and the pixel 15 itself, which is being interpolated. The pixels of this group being interpolated all lie in the same image line y as the interpolated pixel 15 itself in this example and they are arranged symmetrically about this interpolated pixel 15 in the example.

Direction quality values for different image directions for each of these pixels 11, 13, 15, 17, 19 are determined and summed to obtain composite direction quality values for the individual image directions for the pixel 15 being interpolated.

Figure 4:
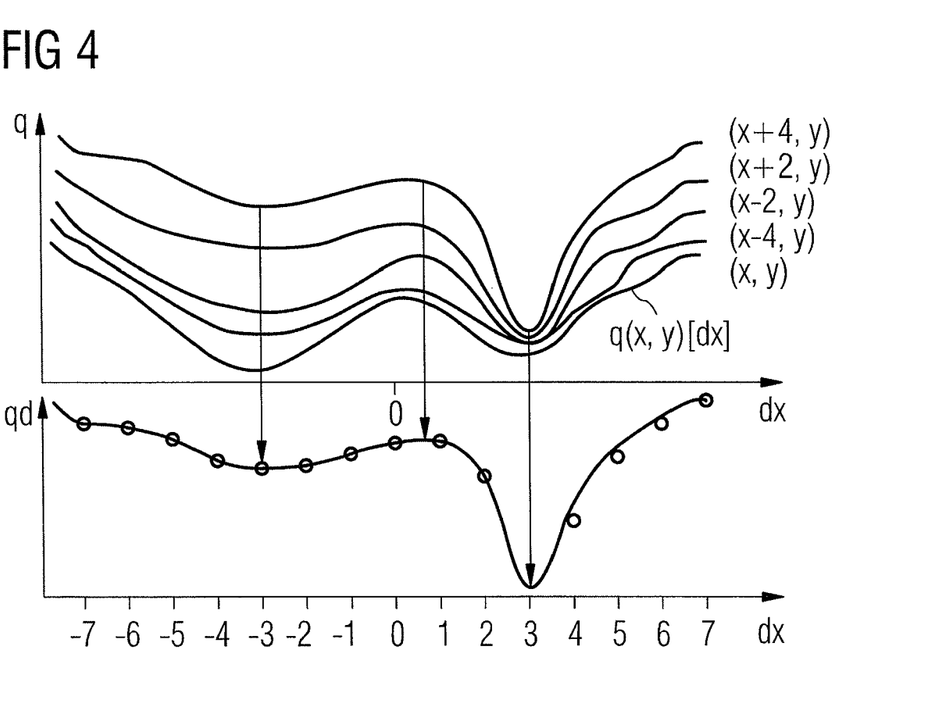
FIG. 4 illustrates advantages of a method according to an aspect of the invention by the plotting of several single direction quality values and the plotting of direction quality values each corresponding to the sum of the single direction quality values.

FIG. 4 shows, for example, in its top part, the plots of the direction quality values for different image directions dx for the individual pixels 11, 13, 15, 17, 19 of the selected group that are being interpolated. The single direction quality values ascertained for a pixel, the determination of which will be explained further below, each represent a measure of the probability of an edge running through the image in the particular direction. For the example of FIG. 4, it is assumed that the single direction quality values are generated such that the probability of the presence of an edge contour in a particular image direction is greater as the single direction quality value is smaller.

As can be seen from the plot of the single direction quality values in FIG. 4, these single direction quality values can have ambiguities in that two or more local minima are present, so that a decision as to the direction of an edge within the image can only be made with some uncertainty.

It has been found that such ambiguities can be for the most part avoided by adding the single direction quality values of the pixels of a group being interpolated, to ascertain composite direction quality values for different image directions. In the example of FIG. 3, the addition of several single direction quality values results in a set of composite direction quality values, which in the example have a pronounced minimum for an image direction dx=3, so that there is a high probability of the presence of an edge contour in this image direction dx=3.

By comparing the direction quality values determined for the individual image directions and assigned to the pixel being interpolated one selects an image direction as the interpolation direction and an image information value is interpolated for the pixel 15 being interpolated by making use of original pixels lying adjacent to the pixel being interpolated in the direction of interpolation. The selection of an image direction as the direction of interpolation involves, for example, determining a minimum for the composite direction quality values and selecting the image direction for which the minimum exists as the direction of interpolation.

The interpolation of the image information value is done, for example, by forming the mean of the pixels of the original image lines y−1, y+1, which lie adjacent to the pixel 15 being interpolated in the direction of interpolation. In the following, we shall denote by dx0 the direction of interpolation found by means of the composite direction quality values, and we then have for the interpolated image information value of the pixel (x,y) being interpolated:

$$S(x, y) = \frac{1}{2} \cdot [S(x - dx0, y - 1) + S(x + dx0, y + 1)]. \tag{3}$$

Whereas FIG. 4 shows plots of the single direction quality values and accordingly plots of the composite direction quality value as continuous curves for a plurality of image directions dx, and especially for image directions with a noninteger dx, in order to reduce the computational expense when determining the single direction quality values it is advantageous to investigate only a given number of image directions, such as only the image directions with dx=−7 . . . 7, and thereby obtain a number of discrete composite direction quality values.

We shall use below the following nomenclature for the single direction quality values: q(u,v)[dx], where q denotes here a single direction quality value, u,v denote the coordinates of the pixel to which this single direction quality value is assigned, and dx denotes the particular image direction for which the single direction quality value was determined. The nomenclature qd(u,v)[dx] will be used below for the composite direction quality values. For the composite direction quality value assigned to the pixel 15 being interpolated with the coordinates (x,y) we have:

$$qd(x, y)[dx] = \sum_i \sum_k q(x + i, y + k)[dx] \tag{4}$$

where i and k denote here the coordinates of the pixels of the group relative to the coordinates of the pixel 15 being interpolated. For the example explained with reference to FIG. 3, in which the pixels 11, 13, 15, 17, and 19 belong to the group, we have k=0 and i=−4, −2, 0, 2, 4.

Figure 5A:
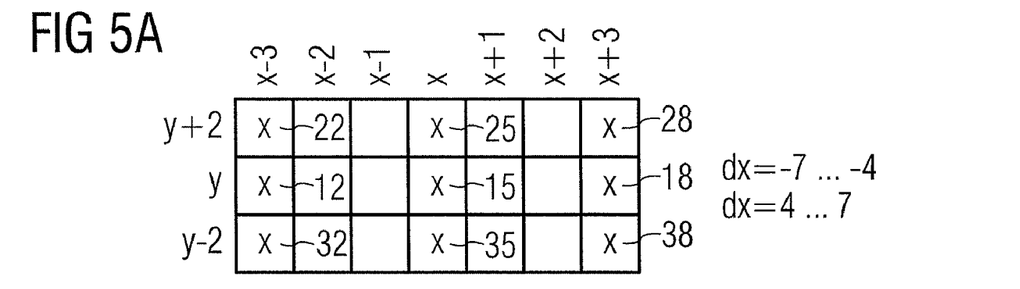
FIGS. 5A-5C pictorially illustrate the pixels adjacent to a pixel being interpolated, whose single direction values are summed up to ascertain a direction value for different image directions of the image.
Figure 5B:
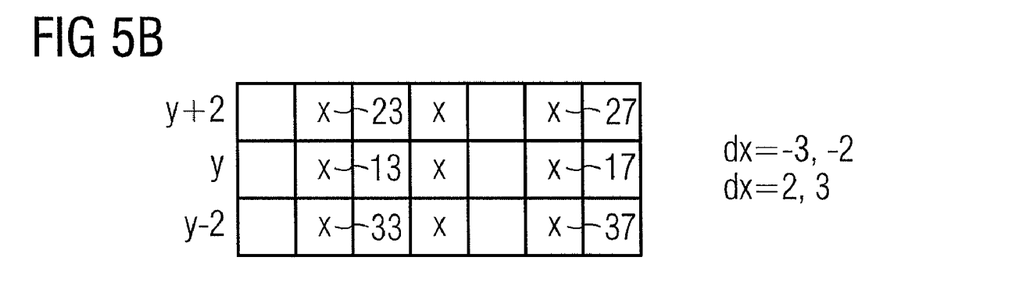
Figure 5C:
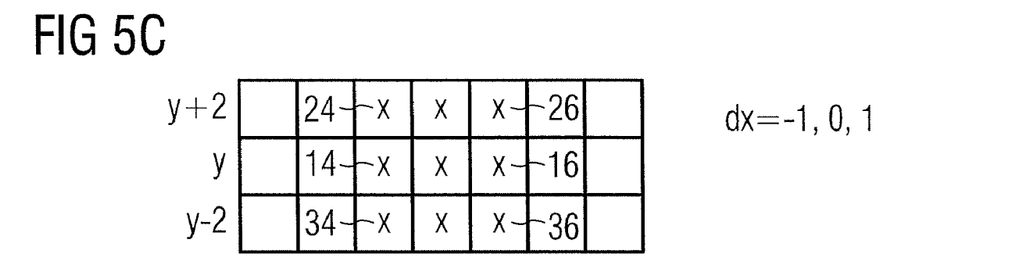

Preferably, the group of pixels whose single direction quality values are added to determine a composite direction quality value is dependent on the particular examined image direction, as will be explained below with reference to FIGS. 5A-5C. FIGS. 5A-5C each show segments of image regions in which the pixels belonging to a group and whose single direction quality values are added to form composite direction quality values are marked by crosses. Since all the pixels of a group come from interlines, FIGS. 5-A-5C show only the interlines. Each of the individual groups contain nine pixels, one of which is the pixel 15 being interpolated.

Referring to FIG. 5A, to determine a composite direction quality value for the image directions dx=−7 . . . −4 and dx= 4 . . . 7 we use the single direction quality values of pixels 12, 15, 18, 22, 25, 28 and 32, 35, 38. The distance of pixels 12, 22, 32 and 18, 28, 38 from the pixel 15 being interpolated in the horizontal direction of the image is three pixels. One obtains the composite direction quality value for the pixel 15 being interpolated for the group represented in FIG. 5A by using equation (4) for i=−3, 0, 3 and k=−2, 0, 2.

A second group of pixels whose single direction quality values are used to determine a composite direction quality value for the image directions dx=−3, −2 and dx=2, 3 are represented in FIG. 5B. This group contains, besides the pixel 15 being interpolated and the pixels 25, 35 arranged adjacent to the interpolated pixel 15 in the vertical direction, also the pixels 13, 23, 33 and 17, 27, 37. The distance of these last mentioned pixels from the interpolated pixel 15 in the horizontal direction of the image is two pixels. One obtains the composite direction quality values for the interpolated pixel 15 for the image directions dx=−3, −2 and dx=2, 3 by using equation (4) for i=−2, 0, 2 and k=−2, 0, 2.

FIG. 5C illustrates a third group of pixels whose single direction quality values are added to determine a composite direction quality value for the image directions dx=−1, 0, 1. This third group contains, besides the interpolated pixel 15 and the pixels 25, 35 arranged adjacent to this pixel 15 in the vertical direction, also the pixels 14, 24, 34 and 16, 26, 36. The distance of the last mentioned pixels from the interpolated pixel 15 in the horizontal direction of the image is one pixel. One obtains the composite direction quality value for the image direction dx=−1, 0, 1 from the single direction quality values by using equation (4), for i=−1, 0, 1 and k=−2, 0, 2.

In the above-explained method, each group of pixels includes a subgroup with a number—in the example, six—of the pixels arranged at a distance from the pixel 15 being interpolated in the horizontal direction. The horizontal distance of the pixels of this subgroup from the pixel 15 being interpolated is greater as the absolute magnitude of the value dx defining the image direction is larger. This is tantamount to saying that the horizontal distance of the pixels of this subgroup from the pixel being interpolated is greater as the angle φ dictating the image direction deviates more from the vertical, or the closer this angle is to the horizontal.

Figure 6:
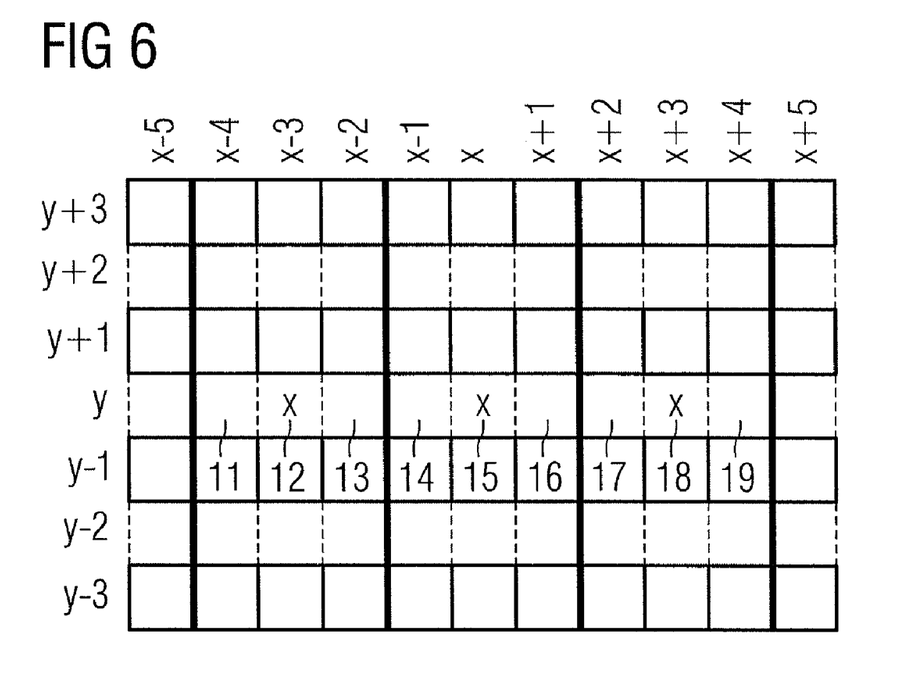
FIG. 6 pictorially illustrates a procedure for selecting the pixels adjacent to a pixel being interpolated when undersampling is used.

To reduce the computational expense, one preferably determines composite direction quality values not for every pixel of an interline being interpolated, but only those for every n-th pixel of an interline being interpolated. One then determines a direction of interpolation for each of these n-th pixels by the composite direction quality values and this direction of interpolation is used as well for the adjacent pixels in the horizontal direction. Referring to FIG. 6, for example, one determines composite quality direction values only for every third pixel in the interline y being interpolated and then determines a direction of interpolation from them. The directions of interpolation found for these pixels 12, 15, 18 are then adopted for the pixels situated adjacent to these pixels, for example, for the pixels 11, 13 in the case of pixel 12, for pixels 14, 17 in the case of pixel 15, and for pixels 16, 19 in the case of pixel 18. When determining directions of interpolation in this way, there is an undersampling with a factor of n. For the groups of pixels discussed with reference to FIGS. 5A-5C, whose single direction quality values are added up, thus the distance of the pixels belonging to one group from the pixel 15 being interpolated is increased by the undersampling factor n. For the composite direction quality value, referring to equation (4) and taking into account the undersampling factor n, we have:

$$qd(x, y)[dx] = \sum_{i} \sum_{k} q(x(n \cdot i), y + k)[dx]. \quad (4a)$$

As already explained, the single direction quality values found for a pixel represent a measure of a probability that an edge runs in the particular direction in the image, for which the single direction quality value has been found. Determining the single direction quality values for a pixel will now be explained by determining a single direction quality value for the pixel 15 with the coordinates (x,y). The finding of the single direction quality value q(x,y)[dx] explained for this pixel 15 applies equally to the other pixels of the group of pixels whose single direction quality values are used to find the direction quality value.

The single direction quality value is dependent on a direction correlation value dm(x,y)[dx]. This direction correlation value forms a measure of the correlation of the image information values of at least two pixels, situated in a given image direction dx adjacent to the pixel with the coordinates (x,y) for which the single direction quality value is being determined. In the most elementary case, the direction correlation value corresponds to the difference of the image information values of the pixels situated in the investigated image direction dx adjacent to the particular pixel, and so we have:

$$dm(x,y)[dx]=|S(x-dx,y-1)-S(x+dx,y+1)| \quad (5).$$

|•| denotes an absolute value. The direction correlation value in this case corresponds to the difference of the image information values assigned to the pixels.

Figure 7:
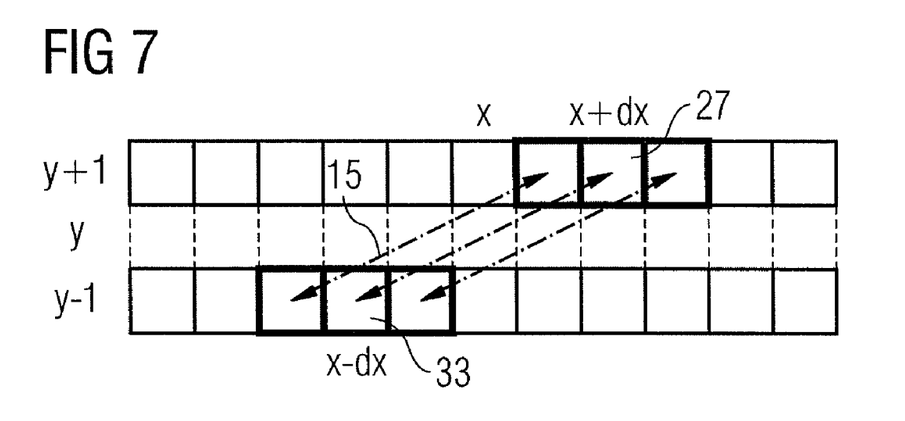
FIG. 7 pictorially illustrates a method for determining a direction correlation value.

FIG. 7 pictorially illustrates determining of this direction correlation value dm(x,y)[dx] of the pixel 15 with the coordinates (x,y). The investigated image direction in the example is the image direction with dx=2. The references 27 and 33 denote the pixels lying adjacent to the pixel 15 in this image direction and whose image information values are used to find the difference to determine the direction correlation value dm(x,y)[dx].

To determine the direction correlation value, making reference to FIG. 7, it is possible to use not only the image information values of the pixels 27, 33, situated adjacent to the pixel 15 in the image direction dx, but also the image information values of those pixels lying adjacent to the pixels 27, 33 in the horizontal direction. Then, we have for the direction correlation value:

$$dm(x, y)[dx] = \sum_{j=-\delta}^{\delta} |S(x - dx + j, y + 1) - S(x + dx + j, y + 1)|. \quad (5a)$$

The variable δ here represents a measure of the number of additional image information values needing to be taken into account.

Generally, the direction correlation value dm(x,y)[dx] is a function of the absolute value of the difference in image information values of at least two pixels situated adjacent to each other in the examined image direction dx.

In general, the single direction quality value q(x,y)[dx] for the pixel 15 is dependent on the particular direction correlation value found for the pixel 15, and therefore:

$$q(x,y)[dx]=f(dm(x,y)[dx]) \quad (6)$$

where f(•) here denotes a function mapping the direction correlation value onto the single direction quality value.

The single direction quality value q for a given direction may correspond, in particular, to the direction correlation value for the respective direction.

A direction correlation value found in the above explained manner for a particular direction dx is smaller as the image information values or the original pixels situated adjacent to each other in the examined image direction dx differ less from each other. Hence, the probability of the presence of an edge contour in this direction is greater the less the image information values of these original pixels differ from each other (i.e., the smaller is the direction correlation value).

Preferably, one will use the vertical direction to determine the direction correlation value, i.e., the direction with dx=0. This can be achieved by adding a constant or variable value to the direction correlation values dm of all the image directions outside of the vertical direction when determining the single direction quality value.

In one embodiment, a vertical correlation value is added to the direction correlation value of each direction. This vertical correlation value represents a measure of the deviation between an interpolation outcome obtained by interpolation in the vertical direction and the interpolation outcome obtained by interpolation in another direction deviating from the vertical direction. For these vertical correlation coefficients we have:

$$mv(x,y)[dx]=|(S(x-dx,y-1)+S(x+dx,y+1))-(S(x,y-1)+S(x,y+1))|=|ip(x,y[dx])-ip(x,y[dx=0])| \quad (7).$$

The first term ip(x,y)[dx] here represents the mean of the original pixels situated in the image direction dx≠0 adjacent to the pixel with the coordinates (x,y), while the second term ip(x,y)[dx=0] represents the mean of the image information values of the pixels which are situated in the vertical direction adjacent to the pixel with the coordinates (x,y). For the single direction quality value q we have, using the vertical correlation value:

$$q(x,y)[dx] = k1 \cdot dm(x,y)[dx] + k2 \cdot mv(x,y)[dx] \quad (8)$$

where k1, k2 denote here weighting factors which determine what weight to allot to the vertical correlation value when determining the single direction quality value. Since mv[dx=0]=0, the vertical direction is implicitly preferred when determining the single direction quality value. A direction other than the vertical direction will only furnish a smaller single direction quality value than the vertical direction if its direction correlation value in consideration of the weighting factors k1, k2 is smaller than the vertical correlation value mv.

The weighting factor k2 by which the vertical correlation value mv is multiplied is preferably variable, to prevent giving preference to the vertical direction in those cases where definitely or with high probability there is no edge contour in the vertical direction.

The probability of the presence of an edge in the vertical direction can be determined, for example, by investigating the image information values of the original image lines situated above and below the image line being interpolated. This will be explained with reference to FIG. 8.

Figure 8:
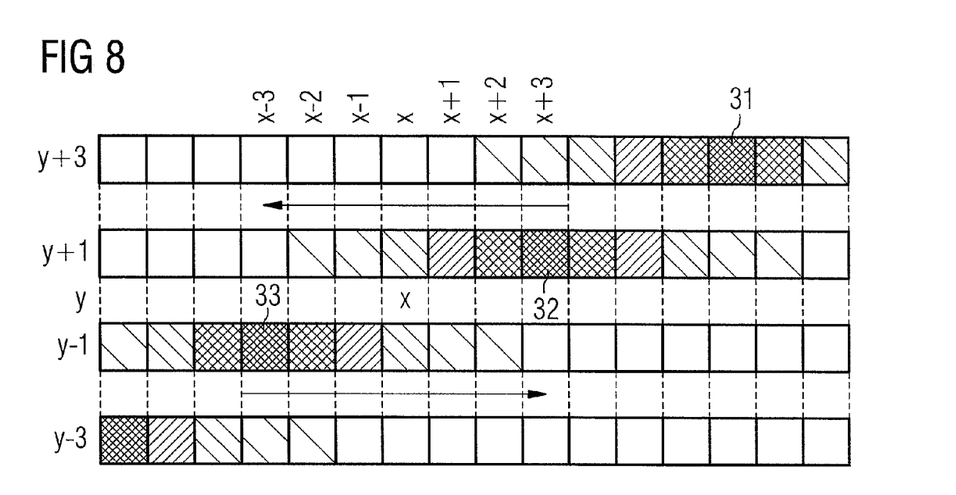
FIG. 8 pictorially illustrates a method for determining a dimensional FIG. for a "flat" contour of "thin edges"

FIG. 8 shows an image segment depicting the interline y being interpolated, as well as two original image lines each y−3, y−1, y+1, y+3 above and below this interpolated interline y. To find a measure for the probability of the presence of a vertical edge, referring to FIG. 8, one investigates the image information values of the original image lines y+1, y−1 situated adjacent to the interpolated line y in the region of the horizontal position x of the pixel 15, for which the single direction quality value is being determined. In FIG. 8, the image information values assigned to the individual pixels are represented by different shading patterns. To determine the probability of an edge contour occurring in the vertical direction, one will find image regions in the horizontal direction in the original image lines y−1, y+1 in the region of the horizontal position of the pixel 15 within which the image information values assigned to the individual original pixels continuously increase (i.e., become larger) or continuously decrease (i.e., become smaller). In particular, one will find such regions lie symmetrically to the horizontal position of the pixel 15 and within which the image information values continuously increase or continuously decrease. In the following, m1 denotes a region within the original image line y+1, in which the image information values continuously increase. The sign of this value determines the direction in which the image information values increase, a positive sign standing for an increase in the image information values to the right and a negative sign for an increase in the image information values to the left. The absolute value of this region value m1 indicates how far the region extends to the left and right, starting from the position of the pixel 15, with the image information values continuously increasing therein. For example, m1=4 means that the image information values in the original image line y+1 continuously increase within a horizontal region extending from position x−4 to position x+4. The region value defined in corresponding fashion for the original image line y−1 lying below the interline y being interpolated is denoted as m2. The investigation of the original image lines y+1, y−1 in the horizontal direction is preferably limited, for example, to a region of 13 pixels situated adjacent to each other in the horizontal direction, i.e., the pixels with the horizontal positions x−6, . . . , x+6. Thus, the maximum absolute value of the region values m1, m2 is 6.

The above explained vertical weighting factor k2 is found by a comparison of the region values m1, m2. For example, for the vertical weighting factor k2 we have:

$$k2 = k3 \cdot vg \quad (9)$$

where k3 here represents a constant factor for the weighting of the vertical correlation coefficient mv, while vg is a value dependent on the comparison of the region values m1, m2, which can take on three different values, for example, namely 0, 1 or 2. For this variable vertical weighting factor we have, for example, vg=2 when none of the following conditions I to IV is fulfilled:

$$vg=0 \text{ for } m1>4 \ \& \ m2<-4 \quad (I)$$

$$vg=0 \text{ for } m1<-4 \ \& \ m2>4 \quad (II)$$

$$vg=0 \text{ for } m1=6, m1=-6, m2=6, m2=-6 \quad (III)$$

$$vg=1 \text{ for } |m1|>2, |m2|>2, \quad (IV).$$

when (I), (II), (III) not fulfilled
A comma (,) in conditions (I) to (IV) stands for a logical OR operation.

An antiparallel increase or decrease of the image information values in the original image lines y−1, y+1, such as when conditions (I) or (II) are obtained, constitutes strong evidence that no edge contour is present in the vertical direction. In this case, the vertical weighting factor is vg=0, so as not to give preference to the vertical direction when ascertaining the single direction quality value (e.g., see EQ. (8)). Such an antiparallel increase or decrease of the image information values can, instead, indicate a thin, slanted line. Such a line is an image structure with two parallel running edges. FIG. 8 shows a segment of such a thin slanted line, i.e., one running at an angle larger than zero relative to the vertical. The references 31-34 in this Figure designate the pixels for which the image information values—which in the example shown are luminance values—each take on maximum values and starting from which the image information values decline to the left and right in the horizontal direction. For the example depicted, we have m1=3 and m2=−3, so that vg=1 would apply. This value vg=1 lies between vg=0 and vg=2 and represents the case when no definite decision can be made in favor of a thin slanted line and thus against a vertical edge (vg=0), but neither can a definite decision be made against a thin slanted line and in favor of a vertical edge (vg=2).

In another embodiment, the conditions for the vertical weighting factor vg=1 are defined more narrowly and vg=1 only if none of the conditions (I) and (II) and one of the following conditions is fulfilled:

$$m1 \geq 2 \ \& \ m2 \leq -1 \quad (Va)$$

$$m1 \geq 1 \ \& \ m2 \leq -2 \quad (Vb)$$

$$m1 \leq -2 \ \& \ m2 \geq 1 \quad (Vc)$$

$$m1 \leq -1 \ \& \ m2 \geq 2 \quad (Vc).$$

The information that no edge contour is present in the vertical direction can be used, arguing conversely, to give preference when determining the single direction quality value to those image directions which depart especially greatly from the vertical direction. This can be accomplished when determining the single direction quality value by adding to the term dependent on the direction correlation value dm a further term which is direction-dependent, and which is smaller as the particular direction deviates more from the vertical. Thus, for the single direction quality value q we have:

$$q(x,y)[dx]=k1 \cdot dm(x,y)[dx]+k3 \cdot vg \cdot mv(x,y)[dx]+k4 \cdot fg \cdot pf[dx] \quad (10).$$

The term k4·fg·pf[dx] here represents a direction-dependent value. k4 is a constant weighting factor, indicating how strongly this direction-dependent value should be weighted in relation to the direction correlation value dm. The additional weighting factor fg is dependent on the vertical weighting factor vg, with:

$$fg=1 \text{ for } vg=0 \quad (11a)$$

$$fg=0 \text{ for } vg \neq 0 \quad (11b).$$

Thus, fg is only 1 to give preference to directions deviating from the vertical direction, when the variable vertical weighting factor vg is equal to zero, and thus when the presence of an edge contour in the vertical direction can be ruled out with high probability. The other factor pf[dx] is dependent on the particular image direction and will be termed hereinbelow the direction-dependent weighting factor. This direction-dependent weighting factor pf[dx] decreases the more the particular image direction deviates from the vertical direction.

Figure 9:
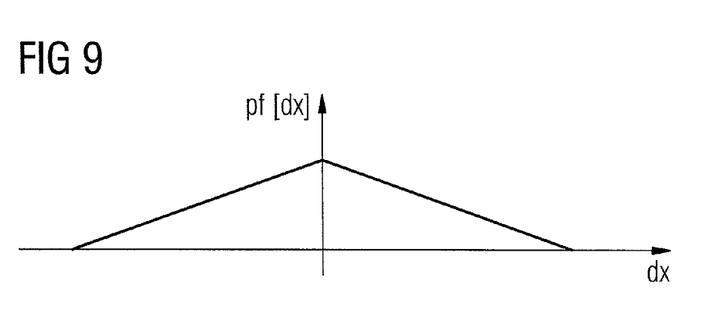
FIG. 9 shows a direction-dependent weighting function.

FIG. 9 shows, as an example, this weighting factor pf[dx] as a function of image direction dx. For this weighting factor we have, for example:

$$pf[dx]=a-|dx| \quad (12).$$

The larger the value dx determining the image direction here, the smaller the weighting factor pf[dx] and the more heavily preferred are "shallow image directions" in ascertaining the single direction quality value according to equation (10). The value a in equation (12) is a constant given value, which for example is equal to the value dx for the "shallowest" image direction investigated when determining the single direction quality value, i.e., the image direction whose direction angle φ is the largest.

It is possible to use a constant additive value pv[dx] when determining the single direction quality values for all directions except the vertical direction. We then have, for the determination of the single direction quality value:

$$q(x,y)[dx]=k1 \cdot dm(x,y)[dx]+k3 \cdot vg \cdot mv(x,y)[dx]+k4 \cdot fg \cdot pf(x,y)[dx]+pv[dx] \quad (13).$$

For pv[dx] we have:

$$pv[dx]=0 \text{ for } dx=0 \quad pv[dx]=b \text{ for } dx \neq 0 \quad (14).$$

This technique ensures that preference is given to the vertical direction in cases where no significant minimum is found for any image direction, so that the vertical direction is chosen as the direction of interpolation.

Preferably, when determining pv[dx], we also allow for the vertical weighting factor vg, so that we have:

$$pv[dx]=0 \text{ for } dx=0 \text{ and } vg=2$$

$$pv[dx]=b \text{ for } dx \neq 0 \text{ or } vg=0,1 \quad (15).$$

The advantage of this technique is that there is a preference for the zero direction only for the case vg=2, i.e., when no lengthier monotonic functions are present above or below, and thus there is slight probability for the presence of a thin, shallow line.

Figure 10:
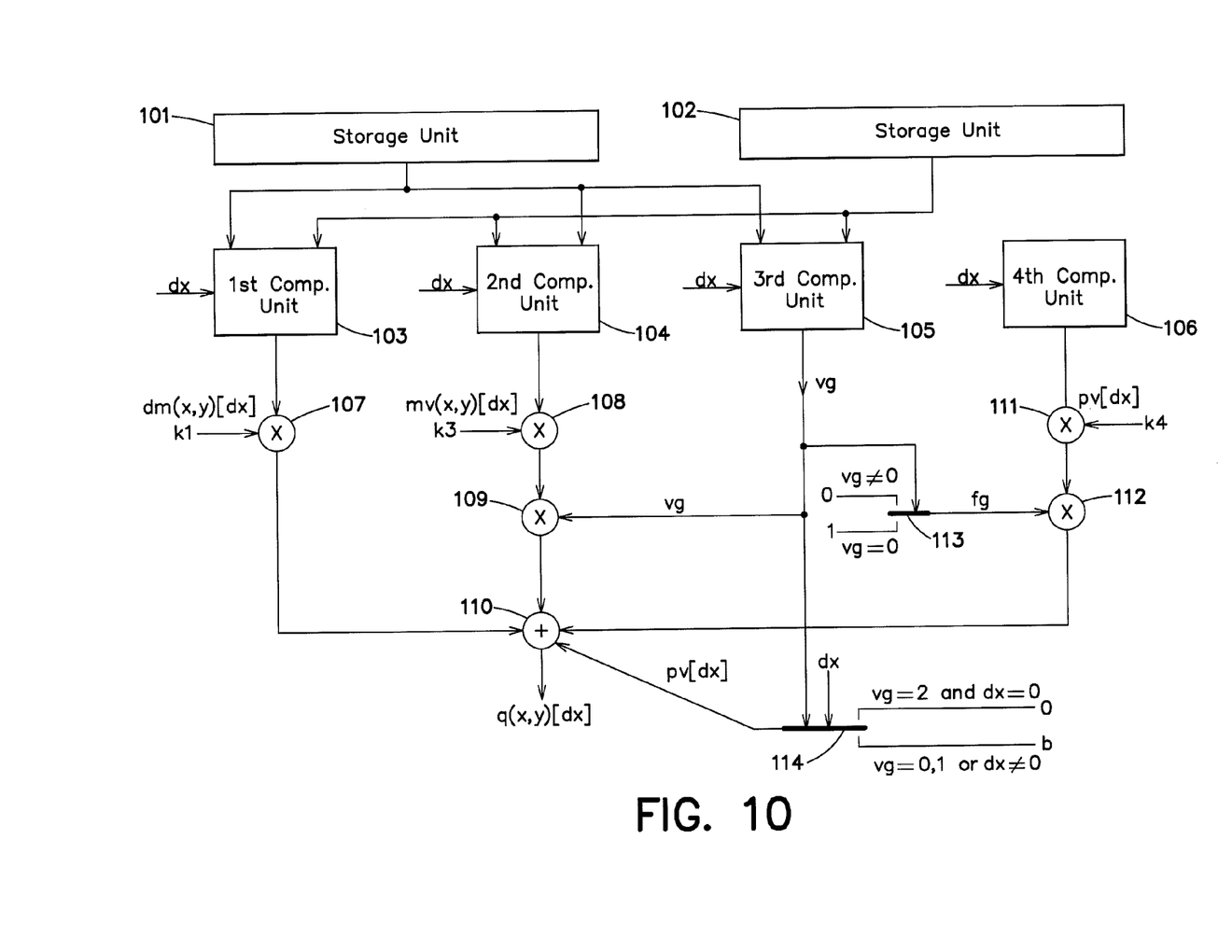
FIG. 10 is a block diagram illustration of a device for determining a single direction quality value.

FIG. 10 is a block diagram illustration of a device for determining a single direction quality value for a given image direction dx. The arrangement contains two storage units 101, 102, each of which serves to save the image information values of the original image lines situated adjacent to the interline being interpolated. The size of these storage units 101, 102 will depend on the image directions being investigated. For image directions with dx=−7 . . . 7, each storage unit must be able to save fifteen image information values of the original image lines lying above and below the interline.

The arrangement has a first computation unit 103, which determines for the respective image direction dx the direction correlation value dm[dx]. A second computation unit 104 determines the above explained vertical correlation value mv[dx], and a third computation unit 105 computes the above explained variable vertical weighting factor vg. A fourth computation unit 106 provides the direction-dependent weighting factor pv[dx]. The individual computation units are provided with the information dx about the particular image direction being investigated.

A first multiplier 107, connected to the computation unit 103, multiplies the direction correlation coefficient dm[dx] by the constant weighting factor k1. The product generated by this first multiplier 107 is taken to an adder 110, whose output provides the single direction quality value q(x,y)[dx] dependent on the respective direction dx. The second computation unit 104 multiplies the vertical correlation value mv[dx] by the constant weighting factor k3. The multiplication product thus obtained is multiplied by an additional multiplier 109 by the variable vertical weighting factor vg produced by the third computation unit 105, and the resultant product is likewise taken to the adder 110. The weighting factor fg is generated by a decision-making unit 113 as a function of the vertical weighting factor vg, the weighting factor fg being zero, as explained, when the vertical weighting factor is vg=1 or 2. The direction-dependent weighting factor pv[dx] provided at the output of the fourth computation unit 106 is multiplied by a fourth multiplier 111 by the constant weighting factor k4, and the multiplication product thus obtained is multiplied by an additional multiplier 112 with the weighting factor fg. The multiplication product resulting from this is taken to the adder 110.

The adder 110 also receives the additional vertical weighting factor pv[dx], generated by an additional decision-making unit 114 in dependence on the vertical weighting factor vg and the image direction dx being investigated.

Determination of the direction of interpolation presupposes that the composite direction quality values qd(x,y)[dx] found for a pixel being interpolated are compared with each other to find a minimum value for these composite direction quality values. The image direction for which the minimum value is found is then chosen as the direction of interpolation. The number of comparisons required will increase with the number of image directions studied and, thus, with the number of composite direction quality values ascertained.

Figure 11:
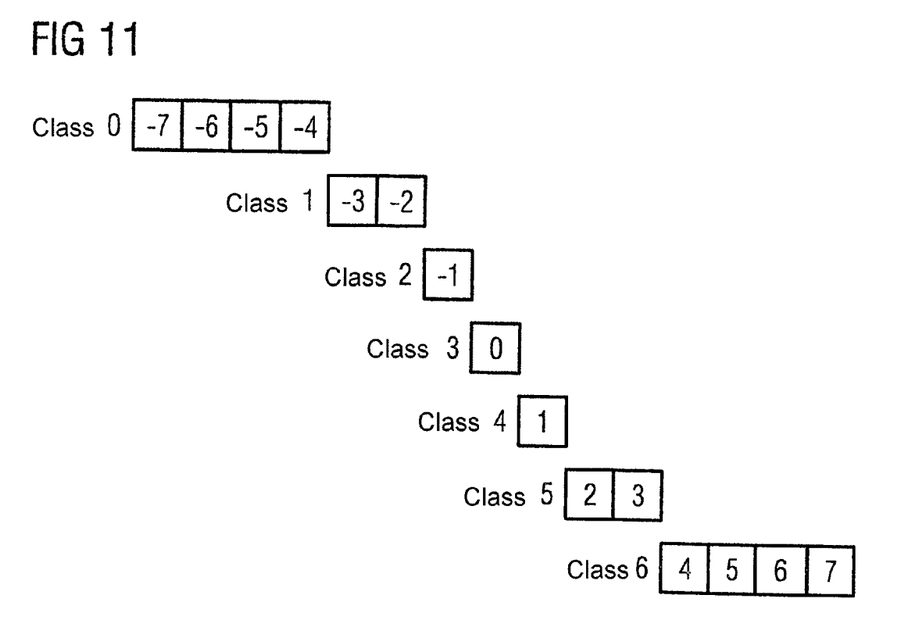
FIG. 11 pictorially illustrates a technique for assembling several image directions into direction classes.

In order to reduce this expense, one can subsume several image directions into a so-called image direction class and assign one class quality value to each of these direction classes. This procedure is explained below with reference to FIG. 11, while for purposes of the explanation it will be assumed that fifteen image directions are being examined, namely, the image directions with dx=−7 . . . 7, so that we first ascertain fifteen single direction quality values for each pixel of the examined group of pixels (see FIG. 3). Referring to FIG. 11, the image directions dx=−7 . . . −4 are subsumed in a class 0, for which one class quality value Q(0) is found. The image directions dx=−3, −2 are subsumed into a class 1, the image directions dx=2, 3 into a class 5 and the image directions dx=4 . . . 7 into a class 6. The image directions dx=−1, dx=0 and dx=1 each form their own class, namely, the classes 2, 3 and 4.

Finding a class quality value Q(•) for an image class involves, first, finding for each pixel of the investigated group of pixels a single class quality value Q'(a)(x0,y0). Here, (x+i, y+k) stands for the coordinates of the respective pixel, and C stands for the respective class. The single class quality value Q'(C)(x+i,y+k) is dependent on the single direction quality values q(x+i,y+k)[dx], which was found for the respective pixel (x+i,y+k) for the directions belonging to the image class C. We generally have here:

$$Q'(C)(x+i,y+k)=f(q(x+i,y+k)[dC]) \quad (16)$$

where f(•) stands for a function of the single direction quality values, dC stands for the different directions of the examined direction class C.

The single class quality value Q'(C)(x+i,y+k) may correspond to the mean value of the single direction quality values found for the particular pixel (x+i,y+k), in which case we have:

$$Q'(C)(x+i, y+k) = \sum_{dC} q(x+i, y+k)[dC]/m \quad (16a)$$

where dC stands for the individual image directions assigned to the image class C.

The single class quality value Q'(C)(x+i,y+k) may moreover also correspond to the minimum value of the single direction quality values found for the respective pixel (x+i, y+k), in which case we have:

$$Q'(C)(x+i,y+k)=\min(q(x+i,y+k)[dC]) \quad (16b)$$

where min(•) stands for the minimum function, and m stands for the number of image directions belonging to the direction class C.

After forming the direction classes, for each of the pixels belonging to the group of pixels there are a number of class quality values Q'(•) available, whose number corresponds to the number of available direction classes. From these single class quality values Q'(•), we then find a class quality value Q(C) for each of the direction classes, which is generally a function of the single class quality values Q'(•). Thus, for this class quality value Q(C) we have:

$$Q(C)=f(Q'(C)(x+i,y+k)) \quad (17)$$

where f(•) is any given function of the single class quality values Q'(•).

The class quality value Q(C) for a direction class may correspond, in particular, to the mean value of the single class quality values or to the minimum value of these single class quality values.

Figure 12:
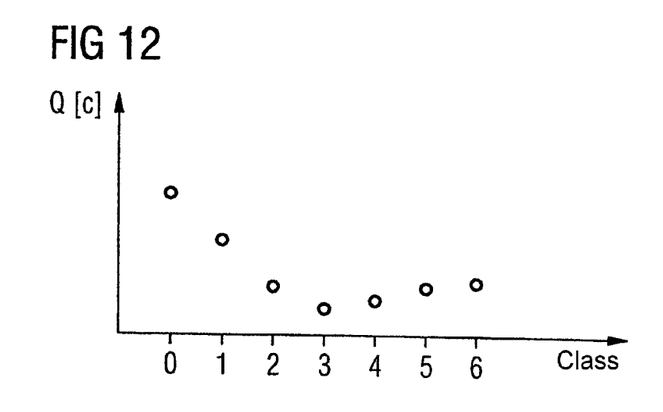
FIG. 12 shows, as an example, the plot of class quality values, each assigned to a direction class.

FIG. 12 shows schematically the plot of the class quality values Q(C). From these class quality values Q(C), we find the respective minimum value, in order to determine a direction of interpolation. Since one class quality value Q(C) can factor in the direction quality values of several image directions, as is the case, for example, with classes 0, 1 as well as 5 and 6, we then select from this direction class an image direction that is used as the direction of interpolation. This choice is made, for example, by determining, for the pixel 15 being interpolated, the direction correlation value dm for each of the image directions belonging to the particular class and selecting the image direction from this direction class for which the smallest direction correlation coefficient is found as the direction of interpolation. If the pixel being interpolated is contained in the pixel group examined, the choice of the direction of interpolation from the selected direction class can also be done by a comparison of the single direction quality values previously found for this pixel. As the direction of interpolation in this case, one will select the image direction for which the "best" single direction quality value was found.

Interpolation of an image information value using direction classes may involve the following steps:
selecting a pixel group containing at least two pixels,
determining a single direction quality value for each pixel of the pixel group, the single direction quality value being dependent on image information values assigned to image regions lying adjacent to the particular pixel of the group in the image direction,
forming direction classes, assigning at least one image direction to each of them,
for each of the direction classes and for each of the pixels of the pixel group: determining a single class quality value, being dependent on the single direction quality values for the particular examined pixel for the individual image directions of the direction class,
creating a class quality value for every direction class from the single class quality values that were found for the respective direction class for the pixels of the pixel group,
selecting a direction class by comparing the class quality values,
selecting an image direction associated with the selected direction class as the direction of interpolation.

Figure 13:
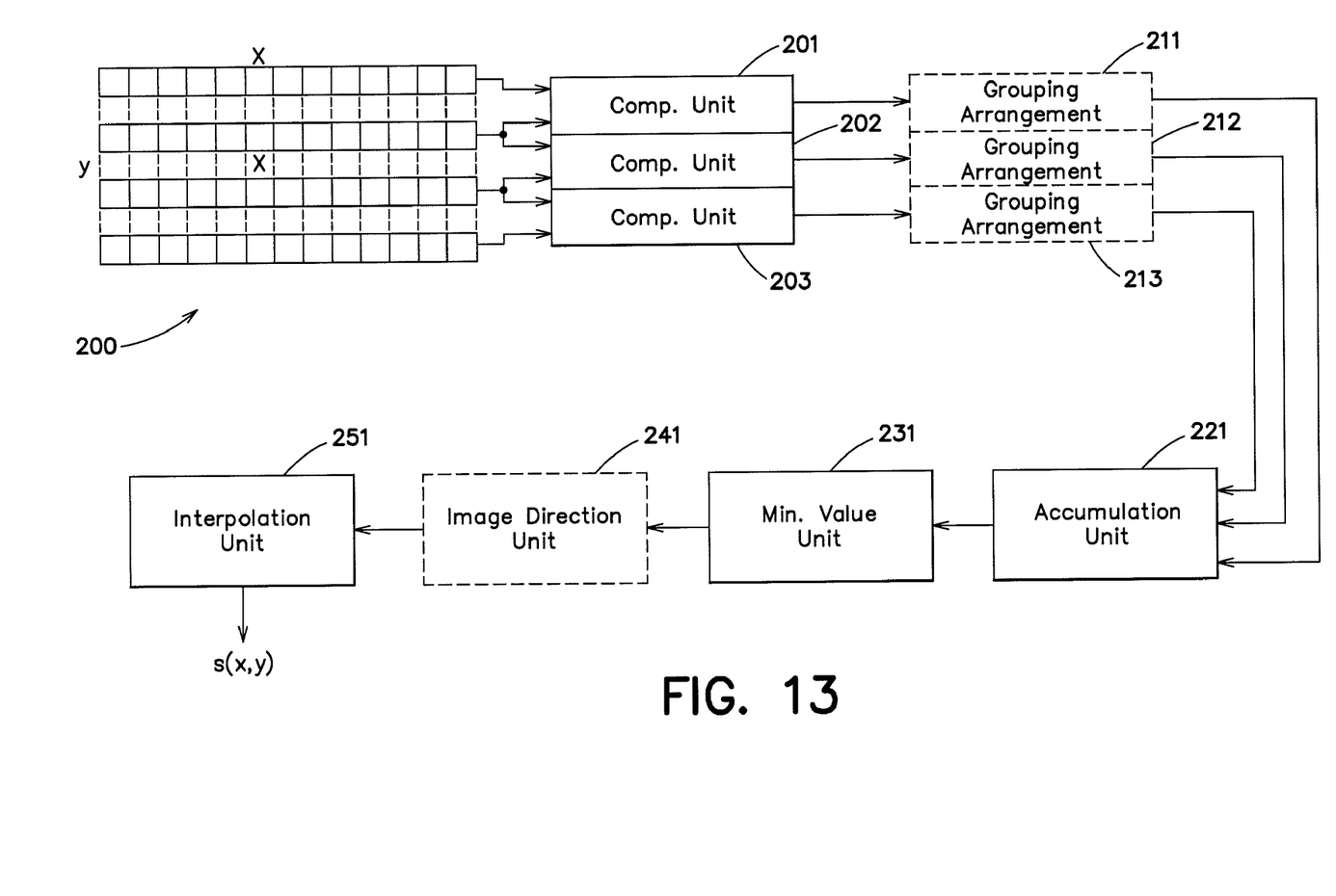
FIG. 13 schematically illustrates a device for implementing an interpolation technique.

FIG. 13 illustrates a device for implementing an interpolation technique. The device 200 determines for a selected group of pixels, by computation units 201, 202, 203, each of which receive image information values of original pixels, single direction quality values for a number of given image directions dx. These single direction quality values are taken to an accumulation unit 221, which assembles the single direction quality values into a composite direction quality value for each of the image directions investigated. The composite direction quality values found for the individual image directions are taken to a minimum value determining unit 231, which determines the minimum value for these composite direction quality values and furnishes information to an interpolation unit 251 as to the image direction for which the minimum composite direction quality value was found. The interpolation unit 251 determines an interpolation value S(x, y) for the pixel 15 being interpolated, taking into account this image direction being used as the direction of interpolation.

In one embodiment, the device 200 also includes grouping arrangements 211, 212, 213, which subsume the single direction quality values into class quality values. The accumulation unit 221 determines in this case from these class quality values a composite class quality value, and the minimum value determining unit 231 determines the minimum value for these class quality values. The minimum value determining unit 231 in this case puts out the value of the class for which the minimum value was found. An image direction determining unit 241 connected to the minimum value determining unit 231 in this case determines within this class the optimal image direction, which is then chosen as the direction of interpolation and communicated to the interpolation unit 251.

Although the present invention has been illustrated and described with respect to several preferred embodiments thereof, various changes, omissions and additions to the form and detail thereof, may be made therein, without departing from the spirit and scope of the invention.

What is claimed is:

1. A method for interpolation of an image information value for a pixel of an interline (y), comprising the steps of:
selecting from a number of image directions (dx), to each of which a direction quality value (qd) is assigned, a direction of interpolation (dx0) by comparing these direction quality values;
determining the image information value (S(x,y)) being interpolated in dependence on image information values assigned to pixels lying adjacent to the pixel (x,y) being interpolated in the direction of interpolation (dx);
ascertaining a direction quality value (qd) for an image direction by
selecting a pixel group having at least two pixels;
determining a single direction quality value (q) for each pixel of the pixel group, the single direction quality value (q) being dependent on image information values assigned to image regions lying adjacent to the particular pixel of the group in the image direction (dx); and
creating the direction quality value as a function of the single direction quality values (q) of the pixel group.

2. The method of claim 1, where the direction quality value is dependent on the sum of the single direction quality values.

3. A method for interpolation of an image information value for a pixel of an interline of an image with several image directions, comprising the steps of:
selecting a pixel group having at least two pixels;
determining a single direction quality value (q) for each pixel of the pixel group, the single direction quality value (q) being dependent on image information values assigned to image regions lying adjacent to the particular pixel of the group in the image direction (dx);
forming direction classes and assigning at least one image direction to each of them;
for each of the direction classes and for each of the pixels of the pixel group, determining a single class quality value, being dependent on the single direction quality values for the particular examined pixel for the individual image directions of the direction class;
creating a class quality value for every direction class from the single class quality values that were found for the respective direction class for the pixels of the pixel group;
selecting a direction class by comparing the class quality values; and
selecting an image direction associated with the selected direction class as the direction of interpolation.

4. The method of claim 3, where the single class quality value is dependent on the sum of the single direction quality values of the image directions of the respective direction class.

5. The method of claim 3, where one of the single direction quality values of the image directions of the particular direction class is chosen as the single class quality value.

6. The method of claim 3, where the minimum value of the single direction quality values of the image directions of the particular direction class is chosen as the single class quality value.

7. The method of claim 3, where the class quality value is dependent on the sum of the single class quality values.

8. The method of claim 3, where one of the single class quality values is chosen as the class quality value.

9. The method of claim 8, where the minimum value of the single class quality values of the pixel group is chosen as the class quality value.

10. The method of claim 3, where a direction class contains several adjacent image directions.

11. The method of claim 3, where the choice of the direction of interpolation from the chosen direction class comprises the steps:
comparing the single direction quality values that were found for the pixel being interpolated for the individual image directions of the selected direction class; and
selecting the direction of interpolation depending on this comparison.

12. The method of claim 11, where the minimum of the single direction quality values is found and in which the image direction for which the minimum was found is selected as the direction of interpolation.

13. The method of claim 3, where a direction correlation value is found for each image direction of the selected direction class and in which the direction of interpolation is chosen by a comparison of these direction correlation values from the image directions of this selected direction class.

14. The method of claim 3, where the group of pixels contains the pixel (15) being interpolated.

15. The method of claim 3, where the group of pixels contains at least one pixel from the interline being interpolated and at least one pixel from another interline being interpolated.

16. The method of claim 3, where the pixel group is chosen depending on the particular image direction.

17. The method of claim 16, where a first pixel group is chosen for a first image direction and a second pixel group for a second image direction.

18. The method of claim 3, where each of the image regions used to find a single direction quality value contains at least two pixels situated adjacent to each other in a line.

19. The method of claim 3, where
for each image direction one finds a direction correlation value (dm) that is dependent on the difference between image information values of at least two pixels lying adjacent to the pixel (x,y) being interpolated in the image direction, and
in which the single direction quality value is dependent on the direction correlation value.

20. The method of claim 3, where
for each image direction one finds a vertical correlation value (mv) that is dependent on a correlation between the direction correlation value of the particular image direction and the direction correlation value for a vertical direction, and
in which the single direction quality value is dependent on the vertical correlation value.

21. The method of claim 3, where in at least one upper image line located above the image line being interpolated, and in at least one lower image line (y−1, y+1) located below the image line (y) being interpolated, one determines the trend of the image information values within the respective line (y−1, y+1) and in which the single direction quality value is dependent on the trend of the image information values within these lines.

22. The method of claim 20, where the vertical correlation value (mv) is set at zero if the image information values in the lower and upper image lines in the region of the position of the pixel being interpolated monotonically increase or decrease in opposite directions for more than a given number of pixels.

23. A device for interpolation of an image information value for a pixel of an interline, comprising
means of selecting, from a number of image directions (dx), to each of which a direction quality value (qd) is assigned, a direction of interpolation (dx0) by comparing these direction quality values;

means of determining the image information value (S(x,y)) being interpolated in dependence on image information values assigned to pixels lying adjacent to the pixel (x,y) being interpolated in the direction of interpolation (dx);

means for ascertaining a direction quality value (qd) for an image direction, comprising:

means for selecting a pixel group having at least two pixels;

means for determining a single direction quality value (q) for each pixel of the pixel group, the single direction quality value (q) being dependent on image information values assigned to image regions lying adjacent to the particular pixel of the group in the image direction (dx); and     means for creating the direction quality value as a function of the single direction quality values (q) of the pixel group.

24. A method for interpolating an image information value for a pixel of an interline (y) of an image with several image directions, comprising:

selecting a pixel group having at least two pixels;

determining a single direction quality value (q) for each pixel of the pixel group, the single direction quality value (q) being dependent on image information values assigned to image regions lying adjacent to the particular pixel of the group in the image direction (dx);

forming direction classes, assigning at least one image direction to each of them;

determining a single class quality value, being dependent on the single direction quality values for the particular examined pixel for the individual image directions of the direction class, for each of the direction classes and for each of the pixels of the pixel group;

creating a class quality value for every direction class from the single class quality values that were found for the respective direction class for the pixels of the pixel group;

selecting a direction class by comparing the class quality values; and means for selecting an image direction associated with the selected direction class as the direction of interpolation.

\* \* \* \* \*